US012464028B2

(12) United States Patent
Loschmann

(10) Patent No.: US 12,464,028 B2
(45) Date of Patent: Nov. 4, 2025

(54) SYSTEMS AND METHODS FOR NETWORK MONITORING, REPORTING, AND RISK MITIGATION

(71) Applicant: FIELD EFFECT SOFTWARE INC., Ottawa (CA)

(72) Inventor: Andrew Loschmann, Ottawa (CA)

(73) Assignee: Field Effect Software Inc., Ottawa (CA)

( * ) Notice: Subject to any disclaimer, the term of this patent is extended or adjusted under 35 U.S.C. 154(b) by 340 days.

(21) Appl. No.: 17/793,381

(22) PCT Filed: Jan. 18, 2021

(86) PCT No.: PCT/CA2021/050046
§ 371 (c)(1),
(2) Date: Jul. 15, 2022

(87) PCT Pub. No.: WO2021/142550
PCT Pub. Date: Jul. 22, 2021

(65) Prior Publication Data
US 2023/0051016 A1     Feb. 16, 2023

Related U.S. Application Data

(60) Provisional application No. 62/962,519, filed on Jan. 17, 2020.

(51) Int. Cl.
*H04L 9/40*     (2022.01)
(52) U.S. Cl.
CPC ........ *H04L 63/205* (2013.01); *H04L 63/1416* (2013.01); *H04L 63/1433* (2013.01)

(58) Field of Classification Search
CPC .............. H04L 63/205; H04L 63/1416; H04L 63/1433
See application file for complete search history.

(56) References Cited

U.S. PATENT DOCUMENTS

| 10,552,615 | B2* | 2/2020 | Cornell | .............. G06Q 10/0633 |
| 2008/0148398 | A1* | 6/2008 | Mezack | ................ G06F 21/552 |
| | | | | 709/224 |
| 2017/0171231 | A1* | 6/2017 | Reybok, Jr. | ......... H04L 63/1433 |

(Continued)

FOREIGN PATENT DOCUMENTS

EP     1405187 A1     4/2004

OTHER PUBLICATIONS

International Search Report and Written Opinion in PCT/CA2021/050046, mailed Apr. 16, 2021, 7 pages.

(Continued)

*Primary Examiner* — James R Turchen
(74) *Attorney, Agent, or Firm* — Brion Raffoul

(57) ABSTRACT

A network monitoring, reporting and risk mitigation system collects events at a computing device within the local network to provide improved network security. The events are aggregated into alerts, which may be processed according to triggering definitions in order to create ARO (action, recommendations and observations) reports providing required or recommended actions to take or observations to a network administrator. The ARO reports may be processed by a remote server in order to generate contextual feedback for updating the triggering definitions.

19 Claims, 4 Drawing Sheets

(56) References Cited

U.S. PATENT DOCUMENTS

| | | | |
|---|---|---|---|
| 2017/0171235 A1* | 6/2017 | Mulchandani | G06F 21/554 |
| 2017/0223039 A1 | 8/2017 | Mont et al. | |
| 2017/0230412 A1* | 8/2017 | Thomas | H04L 63/1416 |
| 2017/0279835 A1* | 9/2017 | Di Pietro | G06N 3/006 |
| 2017/0346846 A1* | 11/2017 | Findlay | H04L 63/1433 |
| 2018/0255099 A1* | 9/2018 | Chen | H04L 63/1425 |
| 2019/0098037 A1* | 3/2019 | Shenoy, Jr. | H04L 63/1441 |
| 2019/0220580 A1* | 7/2019 | Brison | G06F 21/552 |
| 2019/0318100 A1* | 10/2019 | Bhatia | G06F 21/554 |
| 2020/0027096 A1* | 1/2020 | Cooner | G06Q 40/04 |
| 2020/0320845 A1* | 10/2020 | Livny | H04W 12/60 |
| 2021/0103808 A1* | 4/2021 | Armstrong | H04L 41/16 |
| 2021/0194785 A1* | 6/2021 | Raghuramu | H04L 63/1425 |

OTHER PUBLICATIONS

Extended European Search Report dated Jan. 24, 2024, issued in related European Patent Application No. 21741523.1 (12 pages).
PCT International Preliminary Report on Patentability mailed Jul. 28, 2022, issued in related International Application No. PCT/CA2021/050046 (6 pages).

* cited by examiner

SYSTEMS AND METHODS FOR NETWORK MONITORING, REPORTING, AND RISK MITIGATION

CROSS-REFERENCE TO RELATED APPLICATIONS

This application is a National Phase application under 35 U.S.C. § 371 of PCT Application No. PCT/CA2021/050046, filed Jan. 18, 2021, which application is based upon and claims the benefit of priority from U.S. patent application No. 62/962,519 filed on Jan. 17, 2020, the disclosure of which are incorporated herein in their entirety by reference.

TECHNICAL FIELD

The current disclosure relates to systems and methods for monitoring computer networks, and in particular to distributed systems and methods for computer network monitoring, reporting, as well as risk and threat mitigation.

BACKGROUND

Computer networks, and in particular corporate networks are under constant threat of possible cyberattack. Computer networks are increasingly distributed across multiple technical and ownership domains, including cloud services, endpoint devices like servers and personally owned device, as well as traditionally on premise networks. Ensuring that a computer network remains secure is a constant undertaking. Network administrators often have limited resources for managing against potential threats as well as building and maintaining secure networks. Further, the amount of event data that is available from various monitoring systems and network administrators limited expertise to aggregate track and adapt to changing risks and/or threats and to process and understand event records. It is challenging to implement effective network security measures and to continuously monitor for potential threats.

An additional, alternative and/or improved system and/or method for use in providing computer network security, monitoring, reporting and/or risk mitigation is desirable.

BRIEF DESCRIPTION OF DRAWINGS

Further features and advantages of the present disclosure will become apparent from the following detailed description, taken in combination with the appended drawings, in which.

DETAILED DESCRIPTION

Figure 1:
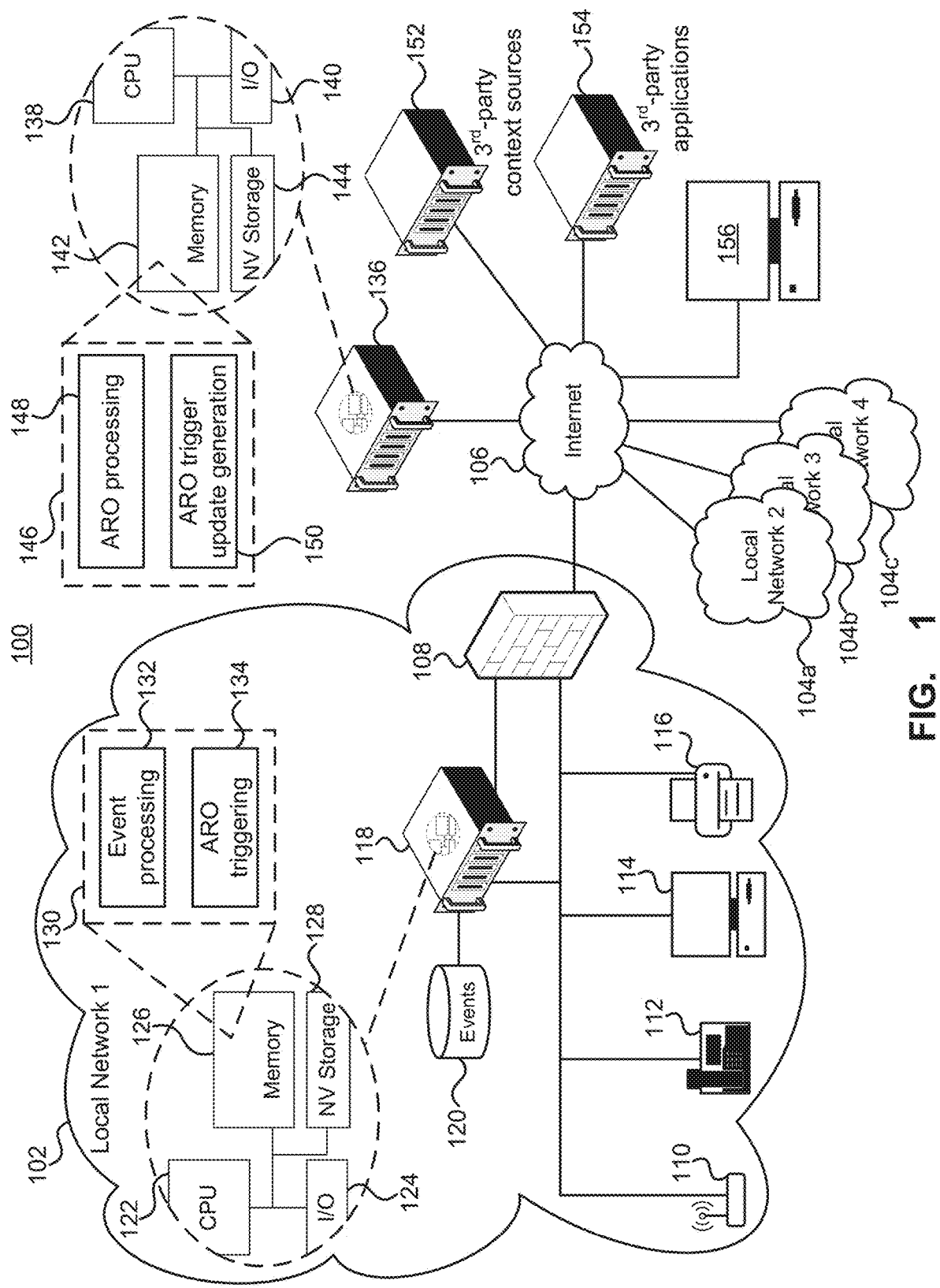
FIG. 1 depicts a network environment incorporating network monitoring, reporting and risk mitigation functionality.

In accordance with the present disclosure there is provided a method of network security monitoring comprising: receiving at a computing device sensor data pertaining to respective network events within a local computing network and generating corresponding events; generating by the computing device one or more alerts from the generated events, each of the one or more alerts associated with alert information and an alert level; processing at the computing device each of the one or more alerts according to a plurality of triggering definitions to trigger an action, recommendation or observation (ARO) security report comprising one or more of: a required action to take to address a potential issue indicated by the ARO; a recommended action to take to address a potential security issue indicated by the ARO; and an observation related to the network security; providing the ARO to a remote server external to the local network; and receiving feedback from the remote server and adjusting at least one of the plurality of triggering definitions based on the feedback.

In a further embodiment of the method, each of the events comprise a respective event type selected from a predefined number of event types.

In a further embodiment of the method, each of the events further comprise received sensor data used in generating the respective event.

In a further embodiment of the method, the sensor data is received from one or more of a network source, an endpoint source, a log source, or a $3^{rd}$ party application.

In a further embodiment of the method, each of the alerts include a respective alert type selected from a predefined number of alert types.

In a further embodiment of the method, each of the alerts further comprise an indication of the events used in generating the respective alert.

In a further embodiment, the method further comprises storing the events and alerts in one or more data stores.

In a further embodiment, the method further comprises generating a user interface for displaying events and/or alerts stored in the one or more data stores.

In a further embodiment, the method further comprises automatically performing the required action of the ARO or the recommended action of the ARO and providing feedback that the action has been performed.

In a further embodiment, the method further comprises notifying an operator of the required action of the ARO or the recommended action of the ARO and providing an interface to the operator for providing feedback that the action has been performed.

In a further embodiment, the method further comprises, at a remote server, receiving one or more AROs and generating and transmitting the feedback to the computing device.

In a further embodiment, the method further comprises at the remote server, collecting contextual information from one or more external contextual sources and wherein the feedback is generated based on one or more received AROs and collected contextual information.

In a further embodiment of the method, processing the one or more alerts according to the plurality of triggering definitions comprises retrieving additional data associated with the one or more alerts and validating the triggering definitions using the additional data.

In a further embodiment of the method, the computing device is located within the local network and the network events, corresponding events, and generated alerts remain within the local network.

In accordance with the present disclosure there is further provided a computing device comprising: a processor for executing instructions; and a memory storing instructions which when executed by the processor configure the computing device to perform the method according to any of the embodiments of the methods described above.

In accordance with the present disclosure there is further provided a method comprising: at a remote server, receiving one or more action, recommendation or observation (ARO); at the remote server, collecting contextual information from one or more external contextual sources; and at the remote server, generating feedback to a computing device for use in adjusting one or more triggering definitions used in triggering AROs.

In accordance with the present disclosure there is further provided a server comprising: a processor for executing instructions; and a memory storing instructions which when executed by the processor configure the computing device to perform the method according to the above method.

In accordance with the present disclosure there is further provided a system comprising: a computing device described above located within a local network; and a server described above located external to the local network.

The network monitoring, reporting and risk mitigation functionality described further below, allows network owners, or operators, to maintain a secure network easily and/or efficiently. As described in further detail the functionality may be deployed across multiple devices, including devices internal to the network being monitored as well as devices external to the network being monitored. The internal devices collect, process and possibly store, network related events relevant to monitoring the network. The internal devices also process the collected events in order to generate alerts, which may in turn trigger an Action, Recommendation or Observation (ARO). The events may be promoted to alerts, possibly as an aggregation of a plurality of events, as an enrichment of one or more events, or as an individual event. One or more alerts may result in generating an ARO that provides required or recommended actions to take in order to maintain a secure network, or observations of the network that may be helpful to the network manager. The ARO(s) may be automatically generated based on the alerts as well as other context, including for example whether the actions of previous ARO(s) have been taken. The ARO(s) may be generated by one or more network devices that are located on the internal network being monitored and as such the network event information collected and processed by the device(s) may remain internal to the network which is desirable both to possibly reduce network bandwidth sent over an internet connection as well as maintaining the security of the information. The ARO(s) may be provided to an external server that receives AROs, possibly from a plurality of different monitored networks and can process the AROs, along with other contextual information such as new network risks/threats that are occurring, in order to generate updates to the ARO triggering functionality that can be provided to the internal network devices in order to update how the AROs are generated. The network monitoring, reporting and risk mitigation systems and methods described herein allow owners/managers of networks of varying sizes from small to large to easily maintain their network while still maintaining control over their networks.

FIG. 1 depicts a network environment incorporating network monitoring, reporting and risk mitigation functionality. The environment 100 depicts a first local network 102 which is described in further detail below. The environment may include additional local networks 104a, 104b, 104c (referred to collectively as local networks 104), which may include similar functionality to that described below with regard to local network 102. The local networks 102, 104 may be communicatively coupled to the Internet 106.

Turning to the local network 102, the network may be for example a corporate network or portion of a corporate network, a home network, a publicly accessible network, a network for providing cloud services, or other computer or data communication network. Although the particular details of the local networks may vary, they will include some form of edge device 108, such as a firewall, capable of controlling network traffic into and out of the internal network. The local network 102 will include one or more network devices including, for example a routers, switches, hubs, access points 110 etc. allowing devices to communicate on the network. The local network 102 may communicatively couple a number of computing devices together including for example VoIP (Voice of IP) phones 112, desktop and laptop computers 114, printers 116. It will be appreciated that other devices may be connected to the network including servers, network storage devices etc.

In order to monitor the local network 102 a network monitoring device 118 may be provided within the local network. The network monitoring device 118 may be communicatively coupled to the network to provide network communication and may also include a high performance network tap device that allows the network monitoring device 118 to capture all network events and related data including for example packets sent/received, DNS requests, etc. Although depicted as being internal to the local network 102, it is possible to locate the network monitoring device on the exterior of the local network 102 for example using a virtual private network (VPN) connection. As described further, the network data, as well as data such as file access information, sign on information, as well as other data sources may be collected by the network monitoring device 118 and processed into events. The events may be stored in an event data store 120. The events may be stored for a given period of time, for example a day, week, month, months, year etc. The length of time to store the events may be based on the amount of storage available, client requirements, and/or as well as possibly the amount of events generated. Further, different events may be stored for different lengths of time. It may be desirable to store events in order to help with investigating network vulnerabilities or problems.

The network monitoring device 118 may be a programmable computing device comprising, for example, a central processing unit 122 for executing programming instructions in order to configure the computing device 118 to provide various functionality. The computing device 118 may further include one or more input/output (I/O) interfaces 124 which may include for example network communication interfaces, high performance network taps, keyboard/mouse interfaces, etc. The computing device 118 further includes memory 126 and non-volatile storage 128. The non-volatile storage 128 provides a large storage area for the permanent, or semi-permanent storage of data which persists even in the absence of power. The memory 126 provides for the working storage of data and instructions used by the CPU in configuring the monitoring device 118. The instructions stored in the memory 126 when executed by the CPU 122 configure the monitoring device to provide various functionality.

The monitoring device 118 is configured to provide network monitoring, reporting and risk mitigation functionality 130. The functionality 130 includes event processing functionality 132 that ingest data from one or more sources and generates events. The events may be aggregated, or otherwise processed, to provide one or more alerts. The generated alerts may be processed by ARO triggering functionality 134 that generates an ARO based on the alerts and other contextual information. The ARO may be provided as a data structure that may include an identifier such as a title or unique ID, an optional description as well as an indication of an action or actions to perform to secure the network, which may be for example to update some end point software, reconfigure firewall settings, block a user account, etc. The action may be a required action or a recommended action. The recommended actions may be the same or similar to those of required actions, however recommended actions may not be critical to the security of the network. The action may be related to for example configuration changes to devices on the network, software updates, configuration changes, policy changes, blacklisting or whitelisting source or destination addresses, blocking applications, blocking users, quarantining devices or applications; and updating or modifying anti-virus or malware detection. The actions, whether required or recommended, may be actions that can be performed automatically or may require manual intervention by a network operator or other individual. Additionally or alternatively, the ARO may provide observations about the network. The observations may not necessarily be directly related to a network security threat but may help with understanding and/or correcting network issues. For example, an observation may report on a network condition that reduces the capacity to monitor the network, and so possibly reduce the security of the network. Additionally, the ARO may include one or more references to external data.

The ARO triggering functionality 134 triggers AROs from alerts possibly in coordination with other contextual information. For example, a first set of alerts may cause an ARO to be triggered indicating an action to be taken, say for example updating a piece of end point software. The ARO triggering functionality 134 may take into account feedback indicating that the required action has been taken or performed. Accordingly, if the same alerts persist, the ARO triggering functionality 134 may trigger a new ARO with a different required or recommended action. Further, the ARO triggering functionality may be updated or modified from an external source as described further below.

The ARO triggering functionality 134 may process one or more alerts according to triggering definitions in order to trigger an ARO. The ARO triggering functionality 134 may process the one or more alerts according to each of a plurality of triggering definitions. The triggering definitions to apply to one or more alerts may be determined in various ways including for example a type of the alert. Each triggering definition may specify, for example, a type of alert that the triggering definition applies to, along with one or more conditions that if true will result in an ARO being triggered. In addition to the conditions, the triggering definitions may also specify the result if the conditions are met for the ARO. In addition to specifying conditions, the ARO may also specify additional validating context that is used to further validate the triggering conditions. When processing the triggering definition, the ARO triggering functionality 134 may determine if the alerts meet the conditions of the triggering definitions and if they do, the additional validating context can be determined in order to determine if the ARO should be triggered. If the additional validating context does validate the conditions, the ARO may be triggered. As an example, a triggering definition may have a condition that an email sign on alert is received from a geographic location that differs from the employee's office location. The additional validating context may indicate that the employee was using a VPN connection to the unusual location at the time of the sign on and as such the trigger may be considered as invalid. In validating the triggering definition, the ARO triggering functionality 134 may retrieve additional data associated with the one or more alerts in order to determine if the alerts are actually indicative of a possible threat, risk or vulnerability. The additional data can help provide context to the alerts for use in determining if an ARO should be triggered.

The AROs that are generated may be sent to an external remote server 136. The remote server 136 may receive generated ARO reports from a plurality of different local networks 102, 104. Similar to the monitoring device 118, the remote server 136, which may comprise a CPU 138, one or more I/O interfaces 140, memory 142 and non-volatile (NV) storage 144. The memory 142 stores instructions and data which when executed by the CPU 138 configure the remote server 136 to provide various functionality. The functionality may include ARO functionality 146 that includes ARO processing functionality 148 for receiving ARO reports from one or more of the local networks 102, 104. The ARO reports may be processed and combined with other contextual information, such as for example new network attacks that are occurring, or other threat intelligence including information describing attacker's tradecraft, technology and/or infrastructure. ARO trigger update generation functionality 150 may use the processed AROs and other contextual information in order to generate new ARO triggering definitions or functionality. Additionally or alternatively, the ARO trigger update generation functionality may update, modify or remove existing ARO triggering definitions or functionality. The update to the ARO triggering, whether the update is a new ARO trigger a modification of an existing ARO trigger or removal of an ARO trigger, may be provided to the monitoring devices of one or more of the local networks. The ARO updates may be provided to monitored networks even if the ARO resulting in the update originated from a different network.

The environment 100 may further include one or more servers connected to the internet providing, for example, 3rd-party context sources 152 as well as $3^{rd}$ party applications 154. The 3rd-party context sources 152 may include sources of information that may help to provide useful context to the events, alerts, and/or the AROs. The 3rd-party applications 154 may include for example cloud based applications or services provided to, or accessed by one or more of the computing devices of the monitored devices. Additionally, external computers 156 may be used to remotely access the computing systems, including for example, the monitoring device 118 and the remote server 136.

Although the above has described the event processing and ARO triggering functionality as being within the local network, it is possible for event processing and ARO triggering functionality to be located external to the local network 102 such as on the remote server 136. While it may be advantageous to have the event processing and ARO triggering functionality located on the local network in order to maintain the security of the data, locating the event processing and ARO triggering functionality on the remote server may allow external events to also be processed. For example, a company may use a $3^{rd}$ party online storage service, or a $3^{rd}$ party email service. The event processing and ARO triggering functionality on the remote server may receive the data from the $3^{rd}$ party services and process them in a similar manner as for the internal network.

Figure 2:
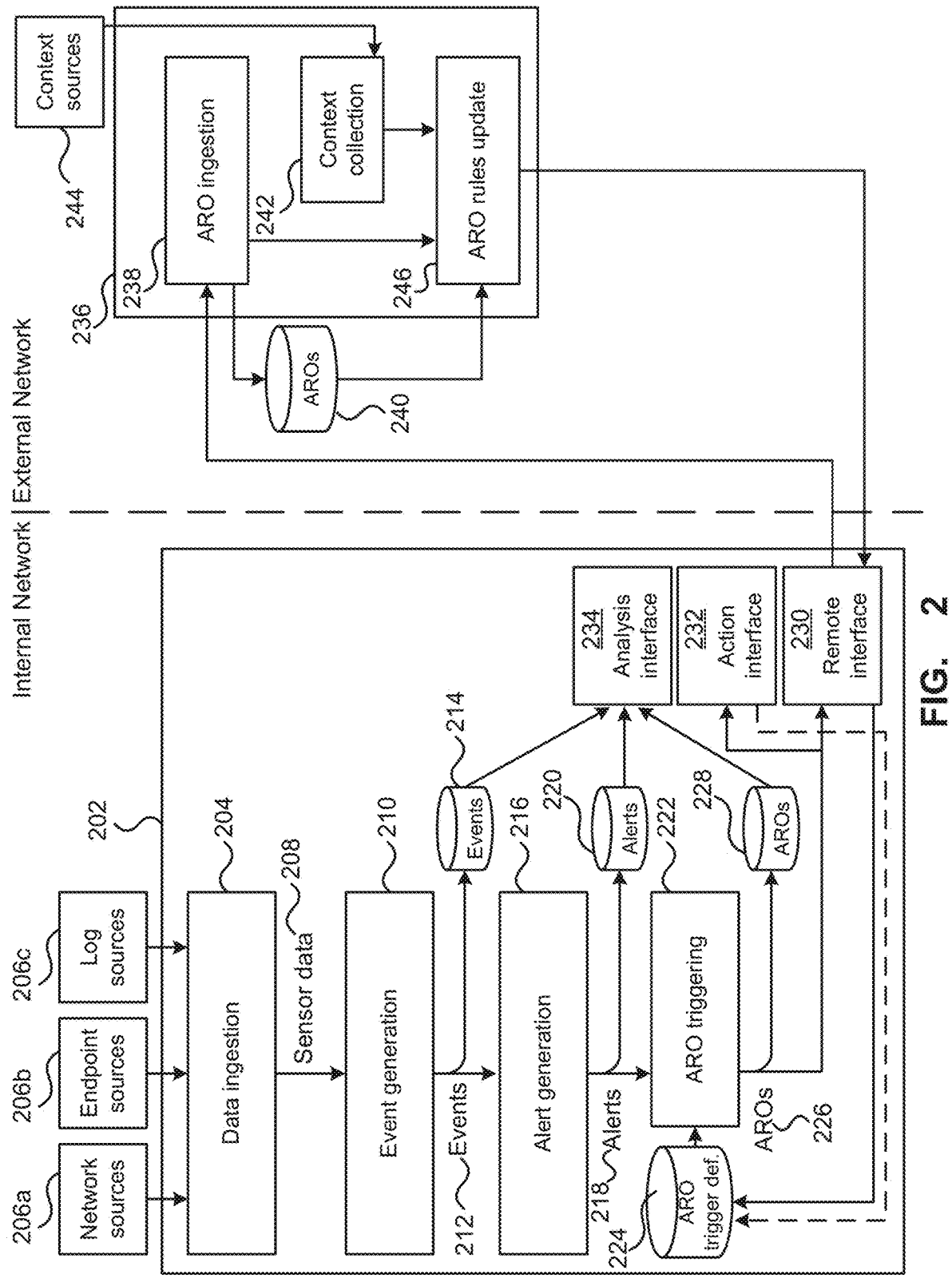
FIG. 2 depicts details of the network monitoring, reporting and risk mitigation functionality.

FIG. 2 depicts details of the network monitoring, reporting and risk mitigation functionality. As described above with reference to FIG. 1, the network monitoring, reporting and risk mitigation functionality is split across at least two devices, namely a monitoring device 118 which may be located within the internal network being monitored and a remote server 136 located externally to the network being monitored. FIG. 2 depicts the functionality provided by each of the devices. Although not depicted in FIG. 2, the remote server 236 may receive AROs from multiple different monitoring devices across multiple different networks.

A monitoring device located within the network being monitored may be configured to provide functionality 202 that receives various data from different sources, and generates AROs. As depicted, data ingestion functionality 204 may ingest data from different data sources 206a, 206b, 206c (referred to collectively as data sources 206). There may be various different types of data sources, such as network data sources 206a, which may for example provide network data such as the packets sent over the network as captured by a network tap device. Additionally or alternatively the data sources 206 may include one or more endpoint sources. The endpoint sources may comprise software executed on endpoints that collect data from the endpoint. For example if the endpoint is a computer, the endpoint could provide information about the computer including for example what applications are currently running on the endpoint. It will be appreciated that the type of endpoint data provided may depend upon the type of the endpoint. Further still, the sources 206 may include one or more logs such as logs of login events, firewall logs, file access logs, etc. Regardless of the data source, the data ingestion functionality 204 receives the data and provides the sensor data 208 to event generation functionality 210. The sensor data can be associated with any type of data received by or generated from network devices such a router, a switch, a hub, an access point, a file or data repository, a document management system, an application server, a web application server, an application logs, a domain server, a directory server, a data loss prevention endpoint process, domain name service, and a client computer process. The event generation functionality 210 receives the sensor data 208 and generates corresponding events 212. Each of the events may have various information including for example identifying information such as a time associated with the event generation, a type of the event which may be one or more of a number of predefined event types, and event information providing specific information about the event. The specific information included in the event may depend upon the event type. As an example, an event type may be a login event, and the event information may include, for example, a computer the login attempt originated from, the account being logged into and whether the login attempt was successful or not. Although not depicted in FIG. 2, the sensor data may be enriched with additional information when generating the events. For example, MAC addresses may be enriched to include a host name associated with the MAC address. The generated events may be stored in a data store 214 as well as being processed by alert generation functionality 216. The alert generation functionality 216 processes the events in order to generate alerts 218. The alerts generation functionality 216 may promote events according to predefined thresholds, rules, or other functionality. For example, an alert may be generated if a threshold number of events, say DHCP (Dynamic Host Configuration Protocol) requests from an endpoint, are received within a defined length of time. Further, the alert generation functionality may generate alerts as an amalgamation of multiple different events. For example, if an endpoint has a number of network events associated with an unknown IP address and a number of events associated with failed logins, the events may be amalgamated into an alert indicating a possible intrusion. The alert generation functionality 216 may process one or more events according to processing logic to generate one or more alerts. Events may be enriched with additional data when generating alerts. Each of the alerts may include identifying information, an alert type which may be selected from a plurality of predefined alert types, as well as alert information such as a severity and/or importance of the alert, and the events that caused the alert. The generated alerts 218 may be stored in an alert data store 220.

ARO triggering functionality 222 may process one or more of the alerts, which may be provided directly from the alert generation functionality 216 or retrieved from the alert data store 220. The ARO triggering functionality 222 processes the alerts according to one or more ARO trigger definitions 224 that specify what alerts, and possibly other contextual information, will cause an ARO to be generated. The ARO trigger definitions 224 may specify other characteristics for triggering an ARO. The characteristics may be specified in for example one or more deterministic rules, one or more probabilistic rules, or machine learning models. The ARO generated by the ARO triggering functionality 222 may include identifying information as well as ARO information such as the one or trigger definitions that caused the ARO report to be triggered along with the underlying alert information and possibly other contextual information. Further the ARO may include an indication of one or more actions to take in order to address a potential problem or issue indicated by the alerts and contextual information. The actions may be either a required action, typically indicating that the underlying alerts indicate a potentially serious problem that needs to be quickly addressed, or a recommended action, which may indicate that the underlying alerts indicate a potential problem or issue that is not of critical importance to the security of the network. Additionally the ARO may simply provide observations or information of the alerts. The AROs 226 generated by the ARO triggering functionality 226 may be stored in an ARO data store 228 as well as being provided to a remote interface 230 and an action interface 232.

The remote interface 230 may transmit the AROs 226 to a remote server for further processing. Further, the remote interface 230 may also receive updates to the ARO trigger definitions and update the trigger definitions stored in the ARO trigger definition data store 224. The AROs 226 can be transmitted to the remote server as they are generated or may be transmitted in a batch process.

The action interface 232 may receive the AROs 226 and, depending upon the required or recommended action, may perform the action or may notify one or more users of the ARO. For example, a required action may be to block a particular port or IP address on a firewall. The action interface may perform the action automatically, if it is possible to automatically perform the action such as update the firewall. Although the actions may be performed automatically, it may still request confirmation from a user to perform certain actions automatically. Alternatively, if the action cannot be performed automatically by the action interface 232 the ARO may be communicated to an operator capable of performing the action. Depending upon the ARO, the operator may be presented with the ARO information by a user interface, or they may be notified by other means such as through email, text messages, telephone calls, an API (Application Programming Interface), other machine to machine communication, etc. The action interface 232 may include the ability to provide ARO feedback that the action has been taken, whether the action was performed automatically by the action interface or it was performed by an individual. The functionality may further include an analysis interface 234 that allows a network operator to review the event information, alert information as well as the ARO report information. The analysis interface may provide a user interface to a user that displays the desired information. The analysis interface may be accessed from one or more other computing devices on the internal network, or possibly from the external network.

The AROs may be transmitted from the remote interface 230 to remote server functionality 236. The server functionality 236 includes ARO ingestion functionality 238 that receives the AROs from one or more internal networks, which may be stored in a data store 240. Context collection functionality 240 may collect contextual information from one or more context sources 244. For example, the contextual information may include indications of new viruses or threats, software updates, etc. ARO rules update functionality 246 may receive collected contextual information from the context functionality 242 and AROs, either directly from the ARO ingestion functionality 238 or retrieved from the ARO data store 240. The information is processed in order to create new trigger definitions, or update or remove existing trigger definitions. The updated trigger definitions may then be transmitted back to one or more of the internal networks and used to update the ARO trigger definitions.

Figure 3:
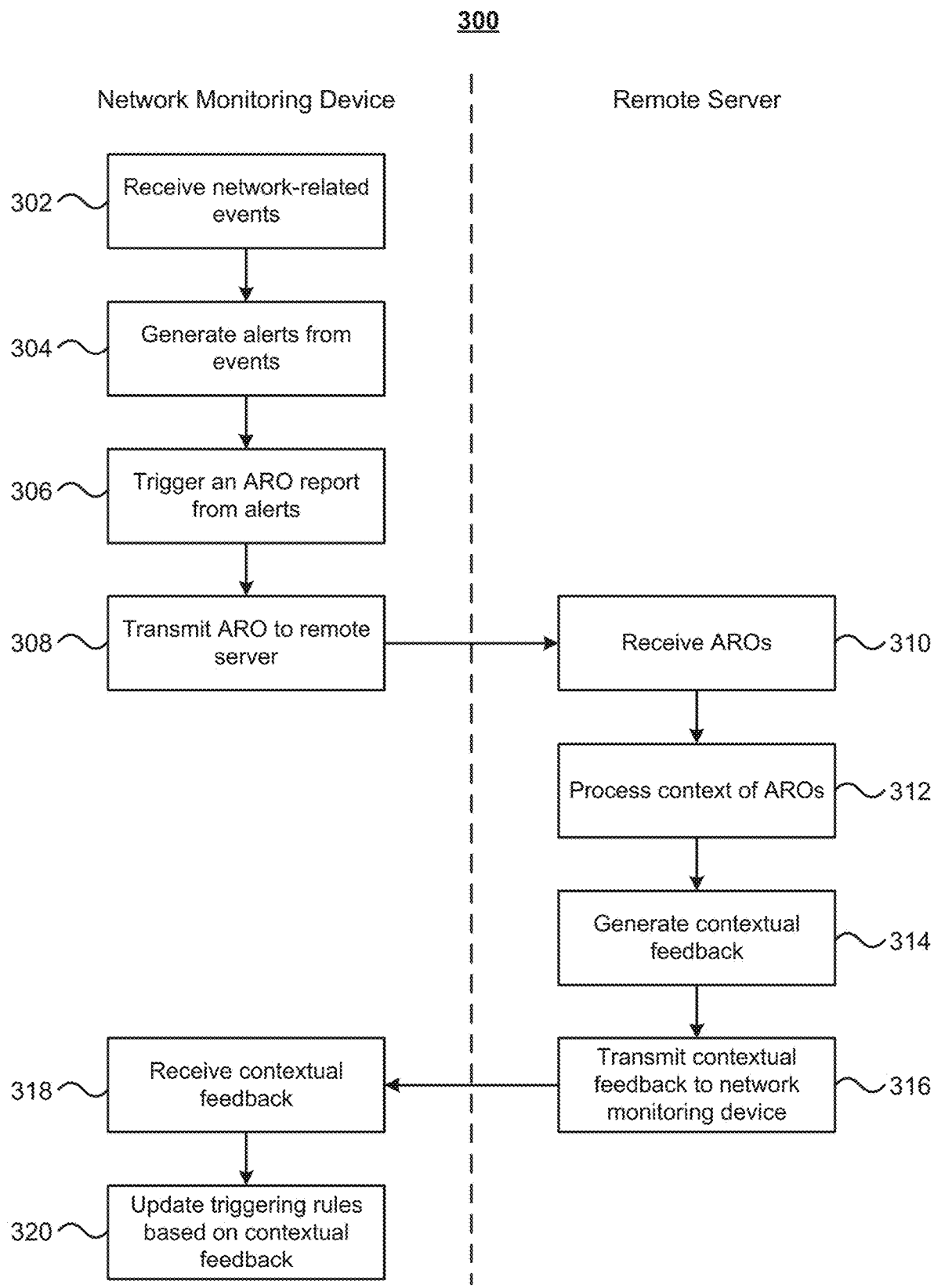
FIG. 3 depicts a method of network monitoring, reporting and risk mitigation.

FIG. 3 depicts a method of network monitoring, reporting and risk mitigation. The method 300 includes a network monitoring device receiving network related events (302). The network related events may receive from network sources, endpoint sources and/or log sources as well as other possible data sources. Alerts are generated from one or more of the received events (304) and the alerts processed according to ARO trigger definitions. Assuming one or more alerts match a trigger definition, an ARO may be generated from the alerts (306). The generated AROs are transmitted to a remote server (308). The remote server receives the ARO(s) 310 and processes the AROs along with contextual information (312) to generate contextual feedback for ARO trigger definitions (314). The generated feedback may specify how to update the trigger definitions. The contextual feedback for the trigger definition update is transmitted to the monitoring device (316). The monitoring device receives the contextual feedback (318), which is used to update the trigger definitions (320). The updated trigger definitions may then be used to generate AROs for subsequent alerts.

Figure 4A:
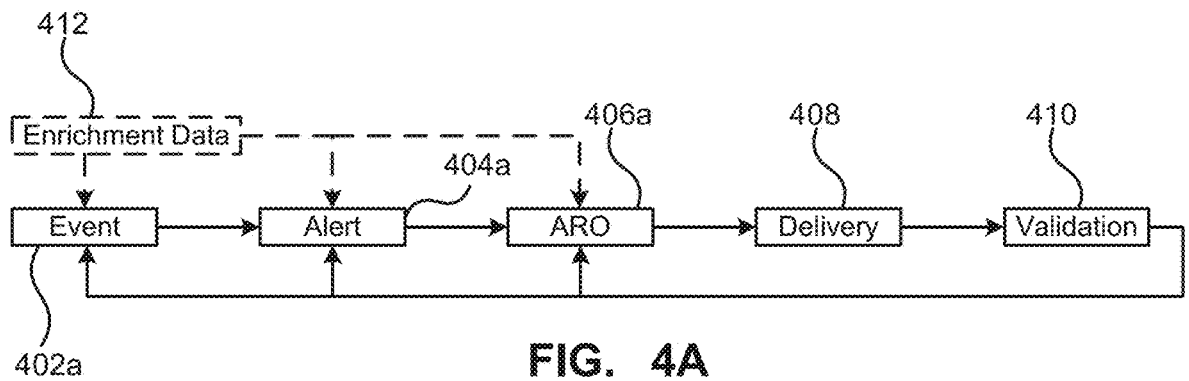
FIGS. 4A-4C depict different ARO (Action, Recommendation or Observation) generation processes.
Figure 4B:
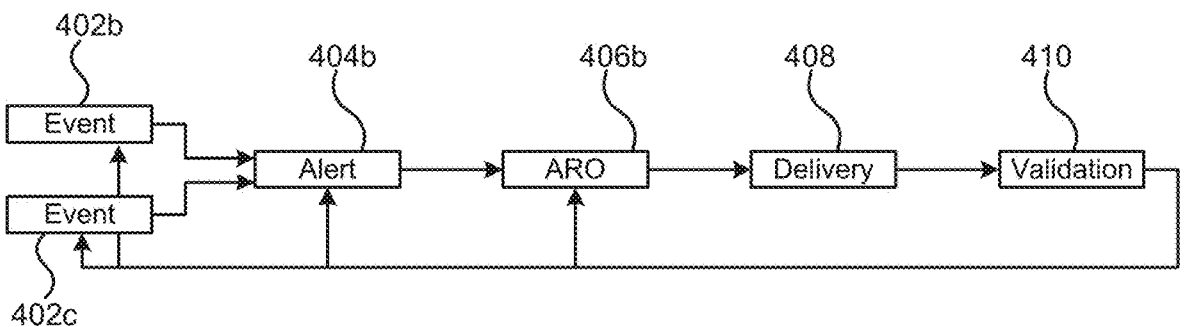
Figure 4C:
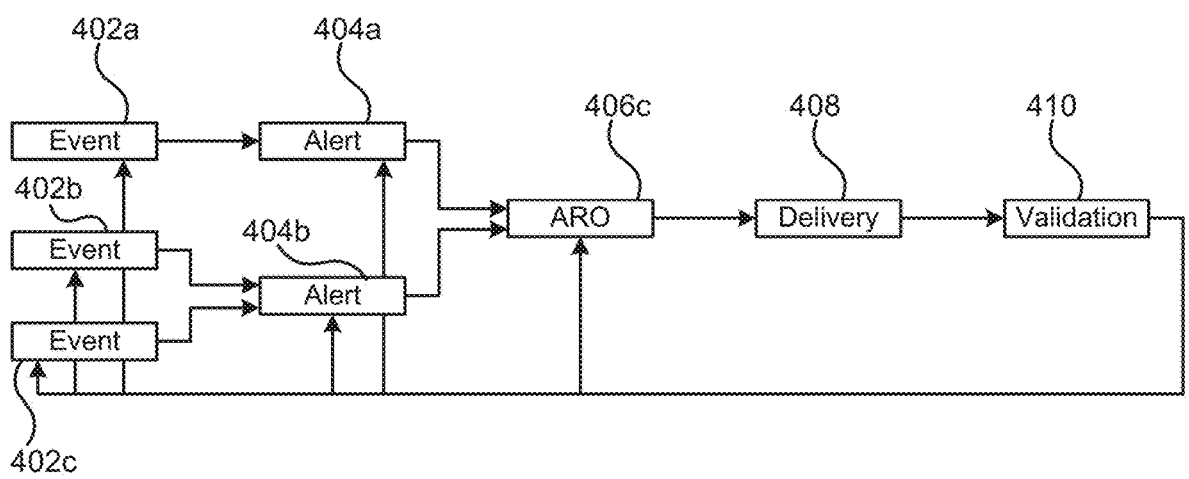

FIGS. 4A-4C depict different ARO generation processes. As depicted in each of the figures, events can be processed into alerts which are processed to AROs, which can be delivered and acted upon and then the ARO validated which may update the functionality for generating the events, alerts and/or the ARO. As depicted in FIG. 4A a single event 402a may be processed and result in a single alert 404a. Similarly, the single alert 404a may be processed according to ARO trigger definitions. One of the ARO trigger definitions may be matched, or triggered, and result in an ARO 406. The ARO 406 may be delivered 408 for example to a network operator or an automatic action interface for performing the action indicated in the ARO. The ARO may also be delivered to a server for processing and validation 410. The validation 410 may provide a feedback loop to update the functionality that generated the event, alter and/or ARO as described above. The generation of events, alerts and AROs may also include enrichment data 412 which may be data that augments, or enriches the data already provided by the event, alert or ARO.

As depicted in FIG. 4B multiple events 402b, 402c may be processed to generate an alert 404b, which in turn generates an ARO 406b. The ARO 406b may be delivered 408 to be acted upon as appropriate and the action or ARO generation validated 410 as described above. Although the events 402b and 402c may be similar in content to event 402a, the processing of multiple events or metadata associated by the combination of events, and associated context, can result in a modified ARO 406b have different alerts, recommendations or observations that ARO 406a. Although not depicted in FIG. 4B, enrichment data may be used in the generation of events, alerts and/or AROs. For example a single access attempt may provide a monitoring recommendation, whereas multiple access attempts may change the recommendation to implement additional security.

As depicted in FIG. 4C a single event 402a may be processed to generate a single alert 404a and multiple events 402a, 402b may be processed to generate a second alert 404b. The multiple alerts 404a, 404b may be processed to generate an new ARO 406c which provides a different actions, recommendations or observations based upon the combination of the alerts and context of alerts independent of ARO 406a and 406b independently. The ARO may be delivered 408 to be acted upon as appropriate and the action or ARO generation validated 410 as described above. Although not depicted in FIG. 4C, enrichment data may be used in the generation of events, alerts and/or AROs. For example multiple access attempts in additional to location or source information of the attempts may generate a recommendation to change security protocols.

As will be appreciated from FIGS. 4A-4C events, alerts and AROs may be generated in various ways. Although not depicted in FIGS. 4A-4C, the same alert(s) may match or trigger multiple different ARO trigger definitions and as such, the same alert(s) may result in the generation of multiple different AROs.

It will be appreciated by one of ordinary skill in the art that the system and components shown in FIGS. 1-4 may include components not shown in the drawings. For simplicity and clarity of the illustration, elements in the figures are not necessarily to scale, are only schematic, and are non-limiting of the elements' structures. It will be apparent to persons skilled in the art that a number of variations and modifications can be made without departing from the scope of the invention as defined in the claims. Numerous additional variations on the methods and apparatus of the various embodiments described above will be apparent to those skilled in the art in view of the above description. Such variations are to be considered within the scope.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application. The program may be in the form of source code, object code, a code intermediate source and object code such as partially compiled form, or in any other form.

The invention claimed is:

1. A method of network security monitoring comprising:
receiving at a computing device sensor data pertaining to respective network events within a local computing network and generating corresponding events;
generating by the computing device one or more alerts from the generated events, each of the one or more alerts associated with alert information and an alert level;
processing at the computing device each of the one or more alerts according to a plurality of triggering definitions to trigger an action, recommendation or observation (ARO) security report comprising one or more of:
 a required action to take to address a potential issue indicated by the ARO;
 a recommended action to take to address a potential security issue indicated by the ARO; and
 an observation related to the network security;
providing the ARO to a remote server external to the local network;
at the remote server, collecting contextual information from one or more external contextual sources;
at the remote server, generating feedback relating to at least one of the plurality of triggering definitions, wherein the feedback is generated based on at least the received ARO and the collected contextual information; and
at the computing device, receiving the feedback from the remote server and adjusting at least one of the plurality of triggering definitions based on the feedback,
wherein each of the one or more triggering definitions comprises:
 an indication of a type of alert to be triggered; and
 at least one condition that, when true, causes the triggering of the type of alert.

2. The method of claim 1, wherein each of the events comprise a respective event type selected from a predefined number of event types.

3. The method of claim 2, wherein each of the events further comprise received sensor data used in generating the respective event.

4. The method of claim 1, wherein the sensor data is received from one or more of a network source, an endpoint source, a log source, or a 3rd party application.

5. The method of claim 1, wherein each of the alerts include a respective alert type selected from a predefined number of alert types.

6. The method of claim 5, wherein each of the alerts further comprise an indication of the events used in generating the respective alert.

7. The method of claim 1, further comprising storing the events and alerts in one or more data stores.

8. The method of claim 7, further comprising generating a user interface for displaying events and/or alerts stored in the one or more data stores.

9. The method of claim 1, further comprising automatically performing the required action of the ARO or the recommended action of the ARO and providing feedback that the action has been performed.

10. The method of claim 1, further comprising notifying an operator of the required action of the ARO or the recommended action of the ARO and providing an interface to the operator for providing feedback that the action has been performed.

11. The method of claim 1, further comprising, at the remote server, receiving multiple AROs, wherein the feedback is generated based on the multiple AROs.

12. The method of claim 1, wherein processing the one or more alerts according to the plurality of triggering definitions comprises retrieving additional data associated with the one or more alerts and validating the triggering definitions using the additional data.

13. The method of claim 1, wherein the computing device is located within the local network and the network events, corresponding events, and generated alerts remain within the local network.

14. The method of claim 1, wherein the sensor data pertaining to respective network events are associated with one or more of login events, firewall logs, endpoint device log data, application events, activity logs or file access logs.

15. The method of claim 1, wherein the sensor data is received from a device selected from the group comprising a router, a switch, a hub, an access point, a file or data repository, a document management system, an application server, a web application server, an application logs, a domain server, a directory server, a data loss prevention endpoint process, domain name service, and a client computer process.

16. A method comprising:
at a remote server, receiving one or more action, recommendation or observation (ARO);
at the remote server, collecting contextual information from one or more external contextual sources;
at the remote server, generating feedback related to one or more triggering definitions used in triggering AROs; and
providing the feedback to a computing device, the feedback being for use by the computing device in adjusting the one or more triggering definitions,
wherein each of the one or more triggering definitions comprises:
 an indication of a type of alert to be triggered; and
 at least one condition that, when true, causes the triggering of the type of alert.

17. A computing device comprising:
a processor for executing instructions; and
a memory storing instructions which configure the computing device when executed by the processor to perform the method according to claim 1.

18. A server comprising:

a processor for executing instructions; and a memory storing instructions which when executed by the processor configure the computing device to perform the method according to claim 17.

19. A system comprising:

a computing device according to claim 18 located within a local network; and a server according to claim 18 located external to the local network.

* * * * *